United States Patent [19]

Buese et al.

[11] Patent Number: 4,895,968
[45] Date of Patent: Jan. 23, 1990

[54] ACID EQUILIBRATION METHOD FOR ORGANCPOLYSILOXANES HAVING CARBON-SILICON-BONDED AROMATIC ORGANIC RADICALS

[75] Inventors: Mark A. Buese, Upper Darby, Pa.; Sandra A. Swint, Schenectady, N.Y.

[73] Assignee: General Electric Company, Schenectady, N.Y.

[21] Appl. No.: 261,450

[22] Filed: Oct. 24, 1988

[51] Int. Cl.$^4$ .............................. C07F 7/08; C07F 7/10
[52] U.S. Cl. .................................................... 556/462
[58] Field of Search ....................... 556/462, 415, 422; 548/406; 549/214

[56] References Cited

U.S. PATENT DOCUMENTS

| | | |
|---|---|---|
| 3,222,320 | 12/1965 | Wolf ............................... 556/462 X |
| 3,978,104 | 8/1976 | Razzano .............................. 556/462 |
| 4,260,715 | 4/1981 | de Montiguy et al. ......... 556/462 X |
| 4,310,679 | 1/1982 | Finke et al. ......................... 556/462 |
| 4,599,437 | 7/1986 | Riederer ............................. 556/462 |

*Primary Examiner*—Paul F. Shaver
*Attorney, Agent, or Firm*—William A. Teoli; James C. Davis, Jr.; William H. Pittman

[57] ABSTRACT

A method is provided for the acidic equilibration of aromatic organic-substituted siloxanes, such as diphthalic anhydrode tetraorganicsiloxane with poly(aliphatic organicsiloxane) without significant cleavage of carbon-silicon-bonded aromatic organic radicals. A reduction in the generation of aromatic organic compounds, such as phthalic anhydride, can be achieved by effecting equilibration by adding the aromatic organic-substituted siloxane to a preformed mixture of acid-catalyzed poly(aliphatic organicsiloxane).

9 Claims, No Drawings

ACID EQUILIBRATION METHOD FOR ORGANCPOLYSILOXANES HAVING CARBON-SILICON-BONDED AROMATIC ORGANIC RADICALS

BACKGROUND OF THE INVENTION

The present invention relates to an acidic equilibration catalyst method for equilibrating organopolysiloxane having aromatic organic radicals attached to silicon by carbon-silicon bonds with poly(organosiloxane) having aliphatic organic radicals attached to silicon by carbon-silicone bonds. More particularly, the present invention relates to a method of reducing cleavage of aromatic organic radicals attached to silicon by carbon-silicon bonds during equilibration, by delaying the addition of such aromatic organic siloxane to the acidic equilibration mixture.

Prior to the present invention, a satisfactory procedure was not available for acid equilibrating organopolysiloxane having aromatic organic radicals attached to silicon without "protodesilation" occurring. In instances where a basic equilibration catalyst such as potassium hydroxide is used, the problem of protodesilation or acid cleavage is avoided. However, basic equilibration cannot be used effectively in instances where the organopolysiloxane has base sensitive functional groups, such as aromatic anhydrides, attached to silicon.

It would be desirable, therefore, to provide a satisfactory procedure for acid equilibrating aromatic organic-substituted siloxanes with poly(aliphatic organic-siloxane)s which minimizes protodesilation.

The present invention is based on the discovery that acid equilibration of poly(aliphatic organicsiloxane) and organicsiloxane having aromatic organic radicals attached to silicon by carbon-silicon bonds, such as phthalic anhydride-substituted organicsiloxane, can be achieved without a significant degree of acid cleavage of phthalic anhydride groups occurring. It has been found that protodesilation of aromatic organic groups from organicsiloxane can be reduced by delaying the addition of the aromatic organic radical-substituted organicsiloxane to the equilibration mixture. If the equilibration catalyst, such as trifluoromethanesulfonic acid, is initially dispersed in the poly(organicsiloxane) substantially free of aromatic organic substitution and the resulting mixture is then blended with poly(aromatic organic siloxane), a significant reduction in acid cleavage of aromatic organic radicals is achieved. It also has been found that alkenyl radicals such as vinyl attached to silicon by carbon-silicon bonds also are less likely to cleave under acidic equilibration conditions if the addition of the alkenyl siloxane is delayed in a similar manner.

STATEMENT OF THE INVENTION

There is provided by the present invention, a method for equilibrating poly(aliphaticorganicsiloxane) and organicpolysiloxane having aromatic organic radicals attached to silicon by carbon-silicon bonds, whereby the tendency of the aromatic organic radicals attached to silicon by carbon-silicon bonds to cleave from silicon atoms is substantially reduced, which comprises:

(1) agitating a mixture comprising poly(aliphatic organicsiloxane) and an effective amount of an acidic equilibration catalyst until the equilibration catalyst is substantially dispersed throughout the resulting mixture and (2) adding organicpolysiloxane having aromatic organic radicals attached to silicon by carbon-silicon bonds to (1) and agitating the resulting mixture at a temperature of about 25° C. to 150° C. until equilibration is effected.

Some of the organicpolysiloxanes having aromatic organic radicals attached to silicon by carbon-silicon bonds which can be equilibrated in accordance with the practice of the present invention are, for example, organicpolysiloxane having an average of from about 1.8 to about 2.5 aromatic organic radicals attached to silicon by carbon-silicon bonds which consists essentially of chemically combined organicsiloxy units having the formula

where R is a $C_{(6-14)}$ aromatic organic radical, $R^1$ is a $C_{(1-8)}$ aliphatic radical, or substituted aliphatic radical, a is an integer equal to 1 to 3 inclusive, b is an integer equal to 0 to 2 inclusive and the sum of a +b is equal to 1 to 3 inclusive.

Aromatic organic radicals which are included within R of the above formula are $C_{(6-14)}$ aromatic hydrocarbon radicals, such as phenyl, tolyl, xylyl, naphthyl, anthryl, and $C_{(6-14)}$ aromatic hydrocarbon radicals, substituted with inert or radicals unreactive during equilibration, such as halo, for example, chloro, bromo, nitro, cyano, anhydride, such as

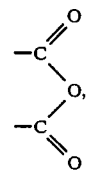

imide

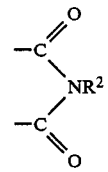

where $R^2$ is selected from hydrogen, R and $R^1$ radicals. Aliphatic radicals which are included within $R^1$ are, for example, $C_{(1-8)}$ alkyl and $C_{(1-8)}$ alkyl substituted with radicals inert during equilibration, such as methyl, ethyl, propyl, butyl, pentyl, hexyl, trifluoroethyl, trifluoropropyl, cyanoethyl and alkenyl radicals, such as vinyl, allyl, propenyl, etc.

Some of the organicpolysiloxanes, which can be equilibrated and can contain chemically combined units of formula (1) are, for example, cyclic siloxane, such as octamethylcyclotetrasiloxane, tetramethyltetravinylcyclotetrasiloxane, hexamethylcyclotrisiloxane, 1,3-divinyltetramethyldisiloxane, hexamethyldisiloxane, hexaphenyltrisiloxane, polydimethylsiloxane, having from about 2 to 200 chemically combined dimethylsiloxy units, 4,4'-(tetramethyldisiloxane-1,3-diyl)diphthalic anhydride, etc.

Acidic equilibration catalysts which can be used in the practice of the present invention are, for example, trifluoromethanesulfonic acid, fluoromethanesulfonic acid, methanesulfonic acid, toluenesulfonic acid, polymeric acid resins, such as Nafion types, acidic clays and aluminas, sulfuric acid and trichloroacetic acid. An effective amount of acidic equilibration catalyst is from 0.05% to 0.2% by weight of catalyst based on the equilibration mixture.

In the practice of one of the preferred forms of the present invention, the poly(aliphatic organicsiloxane) and acidic equilibration catalyst are stirred together at a temperature in the range of from about 25° C. to about 150° C. until a uniform mixture is achieved. Organic solvents which can be used in combination with the polyalkylsiloxane are, for example, any inert organic solvent which is inert to the reactants during the equilibration. Some organic solvents which can be used are, for example, chlorobenzene, toluene, methylene chloride and 1,2-dichloroethane.

After the acidic catalyst has been uniformly dispersed throughout the polyalkylsiloxane, the aromatic organic siloxane can be added to the mixture and then heating of the mixture along with agitation can be continued. Temperatures in the range of from about 25° C. to 150° C. can be employed. In instances where equilibration is effected under neat conditions, a temperature in the range of 130° C. to 150° C. can be used. Equilibration of the ingredients can be achieved in a few minutes. A metal oxide quenching agent, such as magnesium oxide, can be added to the equilibration mixture to quench excess acidic catalyst, or if the catalyst is sufficiently volatile it may be removed by distillation.

In order that those skilled in the art will be better able to practice the present invention, the following examples are given by way of illustration and not by way of limitation. All parts are by weight.

EXAMPLE 1

There was added 20 μl of trifluoromethanesulfonic acid (0.009 m) to a mixture of 0.43 grams of hexamethyldisiloxane (2.65 millimoles) in 26 grams of chlorobenzene (23.5 ml.) at a temperature of 30° C. until thermal equilibrium had been achieved. After the mixture had been stirred for 60 seconds, there was added 1.13 grams of 4,4'-(tetramethyldisiloxane-1,3-diyl)diphthalic anhydride (2.65 millimoles). Aliquots were removed at various times over a period of 19 hours and analyzed by liquid chromatography. The same procedure was repeated except the temperature of 120° C. was used. It was found that the aliquots from the 30° C. run and 120° C. run contained 0.2 mole percent of aliphthalic anhydride which was substantially the same as the level of aliphthalic anhydride in the original 4,4'-(tetramethyldisiloxane-1,3-diyl)diphthalic anhydride. Conversion to 4-(pentamethyldisiloxane-yl)aliphthalic anhydride also was found in both runs.

The same procedure was repeated except that the trifluoromethanesulfonic acid was added to the respective mixtures at 30° C. and 120° C. It contained the 4,4'-(tetramethyldisiloxane-1,3-diyl)diphthalic anhydride, hexamethyldisiloxane and chlorobenzene uniformly dispersed together. The trifluoromethanesulfonic acid was added to each of the respective solutions in shaking for 30 seconds. Aliquots were taken of the various solutions over a period of from 20 to 320 minutes and analyzed by liquid chromatography. It was found that mixtures that were formed at 30° C. contained 3.2 mole percent of phthalic anhydride while aliquots from the 120° C. runs displayed 3.1 mole percent of the phthalic anhydride.

The above results demonstrate that the delayed addition of the 4,4'-(tetramethyldisiloxane-1,3-diyl)diphthalic anhydride to the mixture substantially eliminated acid cleavage or protodesilation of phthalic anhydride from silicon.

EXAMPLE 2

There was added 1.0 μl (0.006 m) of trifluoromethanesulfonic acid, with stirring, to 0.69 grams of octamethylcyclotetrasiloxane at a temperature of 135° C. Sixty seconds after the addition of the acid, 1 gram of 4,4'-(tetramethyldisiloxane-1,3-diyl)diphthalic anhydride (2.35 millimoles) was added to the mixture. After 2 hours, excess magnesium oxide was added to the mixture. Tetrahydrofuran was then added to the mixture and the solution filtered and analyzed by liquid chromatography. Analysis indicated that 0.3 mole percent of phthalic anhydride was present.

The same procedure was repeated except that 1.2 μl of trifluoromethanesulfonic acid (0.005 mole) was added to a mixture of 0.69 grams of octamethylcyclotetrasiloxane (2.33 millimoles) in 2 grams of 4,4'-(tetramethyldisiloxane-1,3-diyl)diphthalic anhydride (4.69 millimoles) which had been melted prior to the addition of the acid. The resulting mixture became homogeneous after 10 minutes. After 2 hours, a slight excess of magnesium oxide was added. Tetrahydrofuran was then added to the mixture and the solution filtered. Analysis by liquid chromatography indicated that 2.2 mole percent of phthalic anhydride was present.

Although the above examples are directed to only a few of the very many variables which can be used in the practice of the method of the present invention, it should be understood that a much broader variety of aromatic organic-substituted organopolysiloxanes and acidic catalysts, as well as alkylpolysiloxanes, can be used as described in the description preceding these examples.

What is claimed is:

1. A method for equilibrating poly(aliphatic organicsiloxane) with organicpolysiloxane having aromatic organic radicals attached to silicon by carbon-silicon bonds, whereby the tendency of the aromatic organic radicals attached to silicon by carbon-silicon bonds to cleave is substantially reduced, which comprises:
   (1) heating with agitation, a mixture comprising poly(aliphatic organicsiloxane) and an effective amount of acidic equilibration catalyst until the equilibration catalyst is uniformly dispersed throughout the resulting mixture and
   (2) adding the organicpolysiloxane having aromatic organic radicals attached to silicon by carbon-silicon bonds to (1) and heating the resulting mixture with agitation until equilibration is effected.

2. A method in accordance with claim 1, where the organicpolysiloxane having aromatic organic radicals attached to silicon by carbon-silicon bonds is 4,4'-(tetramethyldisiloxane-1,3-diyl)diphthalic anhydride.

3. A method in accordance with claim 1, where the poly(aliphatic organicsiloxane) is hexamethyldisiloxane.

4. A method in accordance with claim 1, where the poly(aliphatic organicsiloxane) is octamethylcyclotetrasiloxane.

5. A method in accordance with claim 1, where the acidic equilibration catalyst is trifluoromethanesulfonic acid.

6. A method in accordance with claim 1, where the acidic equilibration catalyst is methanesulfonic acid.

7. A method in accordance with claim 1, where the equilibration catalyst is removed by distillation.

8. A method in accordance with claim 1, where the equilibration mixture is quenched with a metal oxide.

9. A method in accordance with claim 6 where the quenching agent is magnesium oxide.

* * * * *